United States Patent [19]

Kawamura et al.

[11] Patent Number: 5,376,852
[45] Date of Patent: Dec. 27, 1994

[54] THREE-PHASE ARMATURE WINDING

[75] Inventors: Tsutomu Kawamura, Yokkaichi; Nobuo Takechi, Mie, both of Japan

[73] Assignee: Kabushiki Kaisha Toshiba, Kanagawa, Japan

[21] Appl. No.: 97,516

[22] Filed: Jul. 26, 1993

Related U.S. Application Data

[62] Division of Ser. No. 733,217, Jul. 19, 1991, Pat. No. 5,231,324.

[30] Foreign Application Priority Data

Jul. 19, 1990 [JP] Japan .................................. 2-76104
Oct. 17, 1990 [JP] Japan .................................. 2-278200

[51] Int. Cl.$^5$ .............................................. H02K 3/00
[52] U.S. Cl. ...................................... 310/198; 310/184; 310/206
[58] Field of Search ............... 310/179, 180, 184, 198, 310/206, 207, 208, 195, 254, 261

[56] References Cited

U.S. PATENT DOCUMENTS

| | | | |
|---|---|---|---|
| 3,396,324 | 8/1968 | Karlsson | 310/184 UX |
| 4,127,787 | 11/1978 | Avinger | 310/184 |
| 4,200,817 | 4/1980 | Bartoljic | 310/198 |
| 4,260,923 | 4/1981 | Rawcliffe | 310/184 |
| 4,370,581 | 1/1983 | Nakamura | 310/198 |
| 4,394,596 | 7/1983 | Kimura | 310/184 |
| 4,500,806 | 2/1985 | Kanayama | 310/198 |
| 4,672,251 | 6/1987 | Broadway | 310/198 |
| 4,847,526 | 7/1989 | Takehara | 310/198 |
| 5,231,324 | 7/1993 | Kawamura et al. | 310/198 |

FOREIGN PATENT DOCUMENTS 42881 10/1972 Japan .

*Primary Examiner*—R. Skudy
*Attorney, Agent, or Firm*—Limbach & Limbach

[57] ABSTRACT

In a three-phase four-pole armature winding of the double-layer lap type, three first pole windings of respective phases are dispersively arranged in first divided regions obtained by dividing all the slot region into three equal regions and three second pole windings of the respective phases following the respective first pole windings are dispersively arranged in second divided regions obtained by dividing all the slot region into three equally divided regions. Third and fourth pole windings are dispersively arranged in respective slot regions in the same manner. The first and second divided regions are circumferentially shifted from each other by an electrical angle of 180 degrees. Insertion of all the coils belonging to each of the first to fourth pole windings in all the phases is completed by one coil inserting operation of an automatic coil inserter. Accordingly, the windings of all the poles in all the phases can be completed by the coil inserting operation at the number of times same as the number of windings forming one phase. The coil impedance can be equalized in each of the phases since the pole windings take nearly the same radial position among the phase with respect to the iron core.

1 Claim, 3 Drawing Sheets

THREE-PHASE ARMATURE WINDING

CROSS-REFERENCE TO RELATED APPLICATION

This is a divisional of application Ser. No. 07/733,217, filed Jul. 19, 1991, U.S. Pat. No. 5,231,324.

BACKGROUND OF THE INVENTION

1. Field of the Invention

This invention relates to a three-phase slotted armature winding wherein coils are laid in stator core slots such that a winding in each pole in each phase has a multilayer lap winding arrangement.

2. Description of the Prior Art

In the following description, a winding comprises a coil or a plurality of series coils laid in slots for forming each pole and each coil comprises a plurality of turns of an electrical wire. A winding forming a pole is referred to as a pole winding.

A lap winding and a concentric winding are known as coil arrangements in a three-phase armature winding. In the lap winding, coils having the same configuration and coil pitch are placed one upon the other in sequence and laid in the slots. Electric characteristics of each phase are advantageously balanced since the coils have the same configuration and the winding resistance and leakage reactance of each phase are equal. However, the coil inserting work cannot be automatized since the coils of different phases are placed one upon the other into double-layers and laid in one and the same slot, resulting in a disadvantage that the work needs to be manually performed by worker.

On the other hand, in the concentric winding, a plurality of coils different in the coil pitch in a winding of each pole of each phase are laid in the slots so that the coils are distributed so as to be concentric about the pole center. The coils can be laid in the slots by a coil inserting machine generally called automatic coil inserter and the inserter has been widely used for its superior productivity.

Japanese Published Patent Application (Kokoku) No. 47-42881 discloses a double-layer lap type armature winding which has a coil arrangement wherein the automatic coil insertion can be performed at every one pole winding by the automatic coil inserter. In this case, a coil transposing work is eliminated wherein a coil side of the initially laid winding is taken out of the slot when a final winding is laid in the slot, and coil sides of the final and initial windings are laid in the empty slot with the coil side of the initial winding placed on that of the final winding. However, in the case of the three-phase four pole arrangement, for example, the coil inserting operation needs to be performed at twelve times, which number corresponds to the number of poles.

SUMMARY OF THE INVENTION

Therefore, an object of the present invention is to provide a three-phase armature winding of the multilayer lap type which has a coil arrangement capable of reducing the number of times of insertion of the coils into the slots to a large extent in an assembly step of forming a multilayer lap winding by inserting the coils into the core slots by the automatic coil inserter.

Another object of the invention is to provide a three-phase armature winding wherein the coil impedance can be equalized in each of the phases.

The present invention provides an improved three-phase armature winding wherein each pole winding in each phase comprises a plurality of coils laid in armature core slots so that the armature winding is formed into a multilayer lap type arrangement, comprising three first pole windings of the respective phases dispersively arranged in first divided regions obtained by dividing a whole slot region into three equally divided regions and three second pole windings of the respective phases dispersively arranged in second divided regions obtained by dividing the whole region into three equally divided regions, the second divided regions following the first divided regions, the first and second divided regions being circumferentially shifted from each other by an electrical angle of 180 degrees.

According to the above-described arrangement, insertion of all the coils belonging to the first pole windings in all the phases is completed by one coil inserting operation of the coil inserter. Accordingly, the windings of all the poles in all the phases can be completed by the coil inserting operation at the number of times same as the number of windings forming one phase. The number of times of the coil inserting operation is largely reduced in the present invention as compared with that in the coil arrangement of the conventional double-layer lap type armature core.

Furthermore, the coil impedance can be equalized in each of the phases since the pole windings take nearly the same radial position among the phase with respect to the iron core.

Other objects of the present invention will become obvious upon understanding of the illustrative embodiment about to be described with reference to the accompanying drawings. Various advantages not referred to herein will occur to those skilled in the art upon employment of the invention in practice.

BRIEF DESCRIPTION OF THE DRAWINGS

An embodiment of the present invention will be described with reference to the accompanying drawings, in which.

DESCRIPTION OF THE PREFERRED EMBODIMENT

Figure 1:
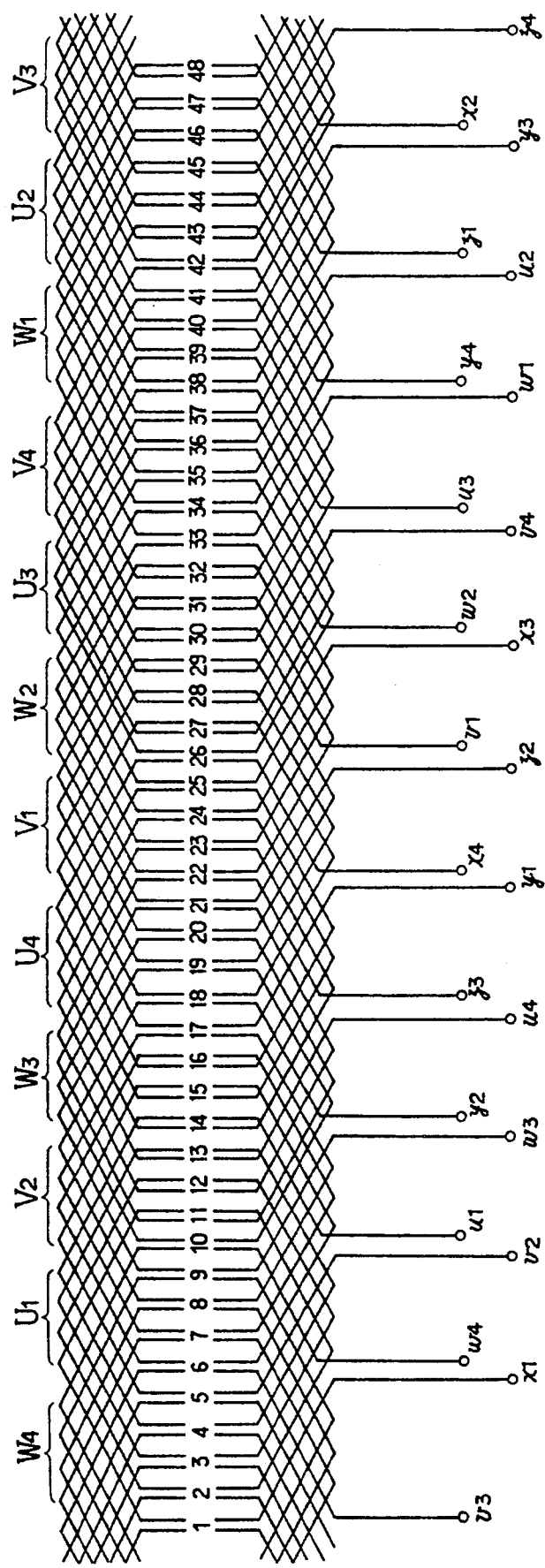
FIG. 1 is a development of the armature winding of an embodiment in accordance with the present invention.

Referring to the drawings, an embodiment of the present invention will be described. The invention is applied to four-pole double-layer lap windings laid in forty-eight armature core slots in the embodiment.

In the drawings, numerals 1 to 48 designate slot numbers. Reference symbols U1 to U4 designate first to fourth pole windings of the phase U respectively. Reference symbols V1 to V4 designate first to fourth pole windings of the phase V respectively. Reference symbols W1 to W4 designate first to fourth pole windings of the phase W respectively.

Figure 2:
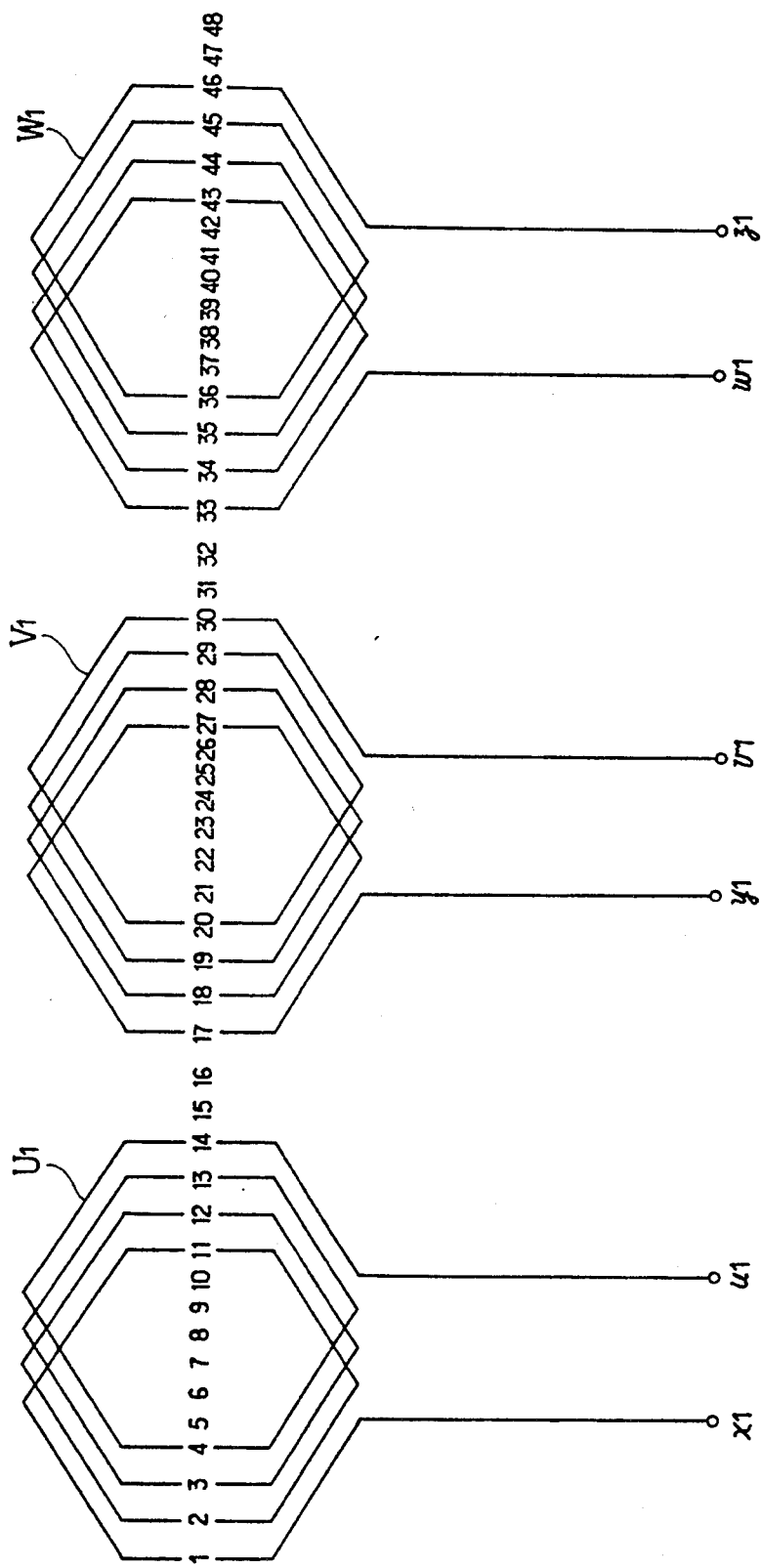
FIG. 2 is a development showing only first pole windings in each phase.

The number q of slots per pole per phase is obtained as $48/3 \times 4 = 4$. Each pole winding of each phase comprises four coils in series and is formed into a double-layer lap winding. More specifically, with respect to the first pole windings U1, V1 and W1 of the respective phases as shown in FIG. 1, the pole winding U1 comprises four coils in series and the other pole windings U2–U4, V1–V4 and W1–W4 each comprise four coils in series, too. Each group of series coils comprises four coils with the same coil pitch connected to one another. For example, the first pole winding U1 of the phase U comprises a coil (with coil pitch of 10) laid in slots #1 through #11, a coil laid in slots #2 through #12, a coil laid in slots #3 through #13, and a coil laid in slots #4 through #14, these coils being sequentially connected. Each of the other pole windings of the phase U and of the pole windings of the other phases is also formed by sequentially connecting four coils with coil pitch of 10. In this case, the four coils composing each pole winding are laid in the successively adjacent slots so that a lap winding is formed, as shown in FIG. 2.

Figure 3:
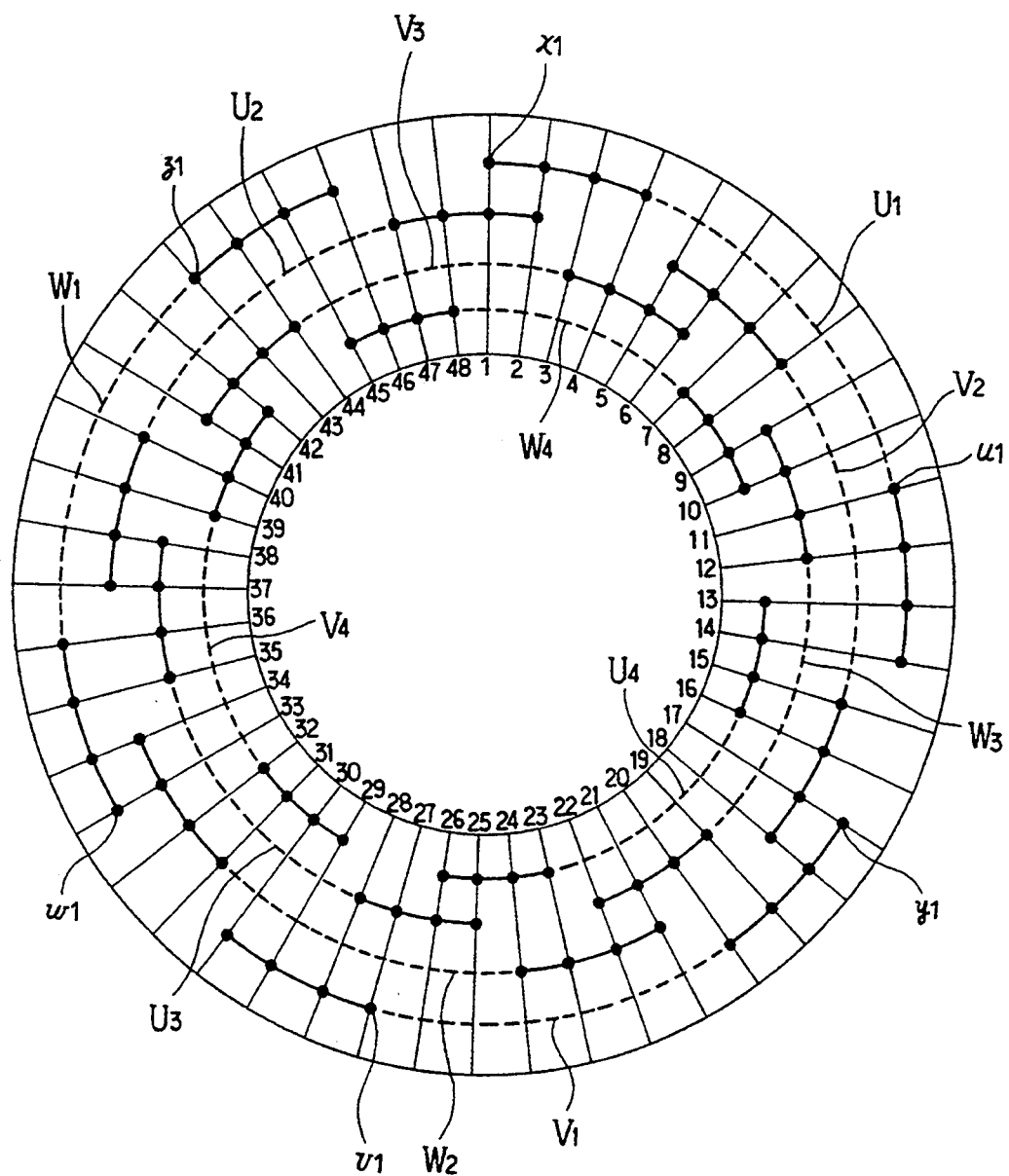
FIG. 3 shows a coil arrangement of the windings shown in FIG. 1.

Referring to FIG. 3, three same pole windings of the respective phases are positioned in respective first divided regions obtained by dividing a whole slot region of the armature core into three equal regions. For example, the first pole winding U1 of the phase U is positioned in the divided region having the slots #1–#14, the first pole winding V1 of the phase V in the divided region having the slots #17–#30, and the first pole winding W1 of the phase W in the divided region having the slots #33–#46. Furthermore, the second pole windings U2, V2 and W2 of the subsequent or second poles of the phases are positioned in respective second divided regions obtained by dividing the whole slot region of the armature core into three equal regions, the second divided regions being spatially shifted by an electrical angle of 180 degrees circumferentially (or in the counterclockwise direction) relative to the first divided regions respectively. The third pole windings U3, V3 and W3 of the subsequent or third poles are also positioned in respective third divided regions obtained by dividing the whole slot region of the armature core into three equal regions, the third divided regions being spatially shifted by an electrical angle of 180 degrees circumferentially relative to the second divided regions respectively. Additionally, the fourth pole windings U4, V4 and W4 of the subsequent or fourth poles are positioned in respective fourth divided regions obtained by dividing the whole slot region into three equal regions, the fourth divided regions being spatially shifted circumferentially by an electrical angle of 180 degrees relative to the third divided regions respectively. It can be understood that the shift of the divided regions by the electrical angle of 180 degrees is equal to the shift of 60 degrees in the clockwise direction in FIG. 3.

The order of insertion of the above-described windings into the slots will be described. First, the first pole windings U1, V1, W1 of the respective phases isolated from one to another by an electrical angle of $4\pi/3$ (corresponding to the true mechanical angle of 120 degrees) are simultaneously laid in the slots. Then, the second pole windings U2, V2, W2 of the respective phases isolated from one to another by the electrical angle of $4\pi/3$ are simultaneously laid in the slots. In the same manner as described above, the third and fourth pole windings U3, V3, W3 and U4, V4, W4 are simultaneously laid in the slots in order. Accordingly, the coil insertion is completed by four times of inserting works, which number corresponds to the number of poles. Upon completion of the inserting works, the armature winding of the double-layer lap type as shown in FIG. 1 is formed.

In accordance with the above-described order of pole winding insertion, each set of three pole windings is simultaneously laid in the slots. For example, the set of the pole windings U1, V1, W1 can be simultaneously laid in the slots since the set comprises the coils which do not have any coil sides laid in the same slots together. Furthermore, the number q of slots in each pole of each phase is determined such that a double-layer winding portion is formed as the result of the simultaneous insertion of the second pole windings U2, V2, W2 following that of the first pole windings U1, V1, W1. Additionally, each coil end has the same radial position in all the phases, and only the position of each pole in the same phase radially differs from one another. That is, as can be understood from the coil arrangement of FIG. 1, the length of the end windings is approximately equal in each phase since the end windings of the coils of each phase are uniformly disposed so as to take the same radial position with respect to the same pole. Consequently, an impedance in the coils in each phase is rendered equal, which can prevent the occurrence of the unbalance in an excitation current and reduction in the electrical characteristics due to the impedance unbalance.

Furthermore, although the armature winding of the embodiment is of the double-layer lap type, the coil insertion can be performed by the automatic coil inserter, which improves the productivity. The shaping of the end windings can be readily performed since the number of conductors in each coil is the half of that in the concentric single-layer type. Additionally, since the percent pitch is 83% when the coil pitch is 10, the harmonic distortion can be reduced, which improves the motor characteristics.

The foregoing disclosure and drawings are merely illustrative of the principles of the present invention and are not to be interpreted in a limiting sense. The only limitation is to be determined from the scope of the appended claims.

We claim:

1. A three-phase armature winding wherein each pole winding in each phase comprises a plurality of coils laid in armature core slots so that the armature winding is formed into a multilayer lap type arrangement, comprising three first pole windings of the phases dispersively arranged in first divided regions obtained by dividing a whole slot region into three equally divided regions and three second pole windings of the phases dispersively arranged in second divided regions obtained by dividing the whole slot region into three equally divided regions, the second divided regions following the first divided regions, the first and second divided regions being circumferentially shifted from each other by an electrical angle of 180 degrees.

* * * * *